June 1, 1965   C. H. WEHLAU   3,186,287
BEARING BUSHES
Filed June 4, 1964

Inventor
C. H. Wehlau

United States Patent Office 3,186,287
Patented June 1, 1965

3,186,287
BEARING BUSHES
Christian Henry Wehlau, 288/310 York Way,
London, England
Filed June 4, 1964, Ser. No. 374,230
Claims priority, application Great Britain, June 22, 1963,
24,908/63; Feb. 1, 1964, 4,381/64
8 Claims. (Cl. 84—251)

This invention relates to bearing bushes which are particularly but not exclusively suitable for use in pianofortes.

For various reasons it is customary and preferable to make some moving parts of pianoforte actions and keyboards of wood: for example in a typical pianoforte action the hammer butt is of wood and is pivotally mounted in a wooden flange by means of a metal pivot pin which extends through the hammer butt and is gripped therein, the end portions of the pivot pin being accommodated in bearing bushes in the flange. A further example is that in a typical pianoforte the keys are of suitably-covered wood and are pivotally mounted to rock when touched by a player, each key being guided by means of two fixed metal (usually known as the balance pin and the bat pin) which extend into the wooden key, portions of the pins being accommodated in bearing bushes in the key. The bushes may be of felt or cloth, and the object is to avoid both friction and looseness as far as possible. A disadvantage with such an arrangement is that the wooden flanges and keys may swell or shrink sufficiently to compress the bushes and cause undesirable friction in unfavourable conditions of atmospheric humidity or temperature.

The invention is therefore intended to provide an improved bearing bush which obviates this advantage.

According to the invention a bearing bush is provided with a bearing portion and mounting means arranged so that compression of the mounting means can occur without causing compression of the bearing portion. In a preferred bush for use with a pivot pin the bearing portion is in the form of an inner sleeve, the mounting means is in the form of an outer sleeve co-axial with and spaced from the inner sleeve, and the inner and outer sleeves are interconnected, for example by an annular portion at one end of the bush. In a preferred bush for use in a wooden key in a pianoforte the bearing portion is formed by two substantially parallel elements and the mounting means comprises two end pieces to which the said elements are connected; and advantageously the mounting means further comprises two outer side portions which are spaced from the said elements and additionally interconnect the two end pieces. Further features of the invention appear from the following description and the accompanying drawings.

Figure 1:
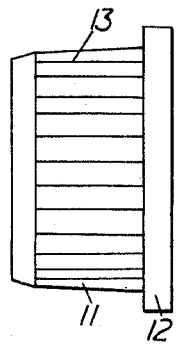
Figure 2:
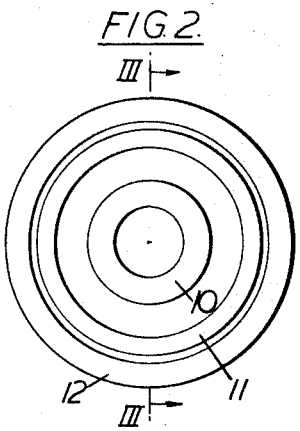
Figure 3:
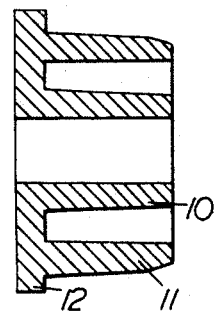
Figure 4:
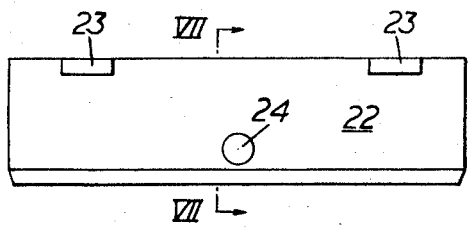
Figure 5:
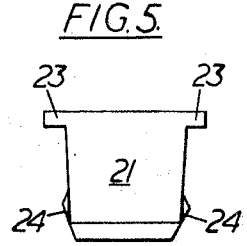
Figure 6:
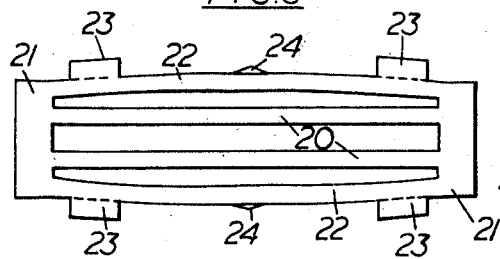
Figure 7:
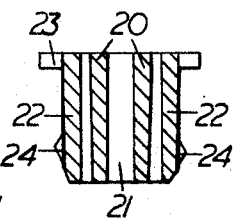

In the accompanying drawing two bushes in accordance with the invention are illustrated by way of example, FIG. 1 being a side elevation of a bush for use with a pivot pin, FIG. 2 an end view of the bush shown in FIG. 1, FIG. 3 an elevation in section on the line III—III in FIG. 1, FIGS. 4, 5, and 6 respectively a side view, an end view and a plan of a bush for use in a wooden key in a pianoforte, and FIG. 7 a view in section on the line VII—VII in FIG. 4.

The bush illustrated in FIGS. 1 to 3 comprises a bearing portion in the form of an inner sleeve 10 and mounting means in the form of an outer sleeve 11 co-axial with and spaced from the inner sleeve 10. The inner sleeve 10 and outer sleeve 11 are interconnected by an annular portion 12 at one end of the bush. The bush is intended to be used in a pianoforte action, and the sleeve 11 is externally bevelled at the end remote from the portion 12 to facilitate pushing this sleeve 11 into a hole in a wooden flange (not shown). The outer surface of the sleeve 11 is provided with grooves 13 parallel to the axis of the sleeve 11 to improve the fitting and retention of the bush in the hole in the wooden flange. The external diameter of the annular portion 12 exceeds that of the sleeve 11, and the flat side surface of the portion 12 remote from the sleeves 10 and 11 can serve as a lateral abutment or side thrust bearing surface for a hammer butt or other part supported on a pivot pin (not shown) extending rotatably into the inner sleeve 10. When the bush is fitted into a wooden flange the flat side of the portion 12 adjacent to the sleeve 11 abuts against the side of the flange, and it is thus easy to ensure that the bush is accurately located in the flange. It is advantageous to make the bush as an injection moulding of a suitable synthetic plastics material (for example as known in commerce under the names DELRIN or TEFLON) and it will be seen that the sleeves 10 and 11 diminish slightly in wall thickness from left to right in FIGURE 3 so that the moulded bush can be readily ejected from the mould. When the bush is in service in a pianoforte action as described any climatic dimensional changes in the wooden flange can occur without causing the inner sleeve 10 to exert undue friction on the pivot pin.

Various modifications may be made, for example ribs or struts may extend radially or otherwise between the outer sleeve 11 and inner sleeve 12, and being relatively thin and easily compressible such ribs or struts will not transmit sufficient force from the wooden flange and outer sleeve 11 to the inner sleeve 12 to cause the latter to grip the pivot pin too tightly. The mounting means need not comprise an outer sleeve but may take the form of radial ribs or other projections which are relatively easily compressible and extend from the bearing portion to engage the wooden flange.

The bush illustrated in FIGS. 4 to 7 comprises a bearing portion formed by two parallel elements 20 and mounting means comprising two end pieces 21 to which the elements 20 are secured. The bush is intended to be used in a wooden pianoforte key and the end pieces 21 are externally bevelled to facilitate pushing the bush into a hole in the wooden key (not shown). It is advantageous to make the complete bush as an injection moulding of a suitable synthetic plastics material (for example as known in commerce under the names DELRIN or TEFLON) and the portions of the bush may diminish slightly in wall thickness from top to bottom as viewed in FIGURE 7 so that the moulded bush can be readily ejected from the mould. When the bush is in service in a pianoforte key of wood a fixed metal pin extends between the elements 20 and any climatic dimensional changes in the wooden key can occur without causing the elements 20 to exert undue friction on the pin because the elements 20 are spaced from the sides of the hole in the key.

The bush shown in FIGS. 4 to 7, in addition to the elements 20 and end pieces 21, comprises two outer side portions 22 which are spaced from the elements 20 and additionally interconnect the two end pieces 21 and are provided with locating flanges or lugs 23 which engage the under surface of a wooden key when the bush is properly pushed into a hole in the key. As shown in FIG. 6 the outer side portions are slightly bowed or curved outwardly; this being the shape of the bush before it is inserted into a hole in a key. There are small conical projections 24 one on each of the external surfaces of the portions 22. When the moulded bush is being ejected from the mould these projections 24 do not prevent easy ejection because the plastics material yields resiliently. The side portions 22 are externally bevelled to facilitate pushing the bush into a hole.

When the bush is being inserted into a hole in a wooden key the bush is first grasped in a tongs-like tool, the jaws of the tool engaging the outer surfaces of the portions 22 between the lugs 23 and bending the portions 22 inwardly towards the elements 20. While grasped in the tongs-like tool the bush can easily be partly inserted into the hole. The said tool is then removed and the bush is pushed into the hole until the lugs 23 engage the under surface of the key. A spreading tool, tapered and of somewhat oval cross-section, is then thrust in between the elements 20 and twisted about its axis to bend out the elements 20 and also the portions 22 until the projections are forced into the wood at the side of the hole and the bush is thereby securely held in the hole. After the spreading tool is withdrawn the elements 20 return resiliently to their initial parallel positions.

Instead of or in addition to being provided with projections the outer surfaces of the side portions 22 may be grooved to engage two of the surfaces bounding the hole in the key. The locating lugs 23 may be provided on the end pieces 21, and the portions 22 may be omitted, in which case relatively thin and easily compressible ribs may extend from the elements 20 so as to engage two of the surfaces bounding a hole in a wooden key where the bush is in use in order to prevent excessive flexing of the elements 20 but not to transmit sufficient force from the key to the elements 20 to cause binding when the key moves relatively to a pin between the elements 20.

Various other modifications may be made, for example ribs or struts may extend between the outer side portions 22 and inner elements 20 in the bush shown in FIGS. 4 to 7 and being relatively thin and easily compressible such ribs or struts will not transmit sufficient force from the wooden key to the inner elements 20 to cause the latter to grip a fixed guide pin too tightly. The mounting means need not comprise end pieces but may take the form of ribs or other projections which are relatively easily compressible and extend from the bearing portion to engage the wooden key.

In bushes comprising end pieces the latter may have grooved or fluted surfaces for engaging surfaces bounding the holes in the keys when the bushes are in use.

I claim:

1. A bush in the form of a moulding of synthetic plastics material for use in a pianoforte key, comprising two substantially flat mutually spaced and parallel elements and two end pieces each connected to both of said elements, both of said end pieces extending laterally beyond the outer side surfaces of both of said elements.

2. A bush in the form of a moulding of synthetic plastics material for use in a pianoforte key, comprising two substantially flat mutually spaced and parallel elements, two end pieces each connected to both of said elements and both extending laterally beyond the outer side surfaces of both of said elements, two outer side portions spaced from and substantially parallel to said elements and both connected to each of said end pieces, and at least one projection located near the middle of the outer side surface of at least one of said outer side portions.

3. A bush in the form of a moulding of synthetic plastics material for use in a pianoforte key, comprising two substantially flat mutually spaced and parallel elements, two end pieces each connected to both of said elements and both extending laterally to equal distances beyond the outer side surfaces of both of said elements, two outer side portions spaced from and substantially parallel to said elements and both connected to each of said end pieces so that said outer side portions and said end pieces together form a periphery of generally oblong shape, and two projections located one near the middle of the outer side surface of each one of said outer side portions.

4. A bush as claimed in claim 3, further comprising a plurality of lugs extending outwardly from outer surfaces of said bush and located along peripheral edges of said bush.

5. A bush as claimed in claim 3, further comprising a plurality of lugs extending outwardly from the outer surfaces of said outer side portions and located along longitudinal edges of said outer side portions.

6. A bush as claimed in claim 3, said outer side portions and said end pieces being externally bevelled.

7. A bush as claimed in claim 3, further comprising a plurality of lugs extending outwardly from and along longitudinal outer edges of said outer side portions, said projections being conical, and said outer side portions and said end pieces being externally bevelled along edges remote from said lugs.

8. A bush as claimed in claim 3, said outer side portions being slightly bowed outwardly.

References Cited by the Examiner

UNITED STATES PATENTS

| 1,923,892 | 8/33 | Skillman | 308—238 |
| 2,580,436 | 1/52 | Knoblaugh | 84—251 |
| 2,580,438 | 1/52 | Knoblaugh | 84—251 |
| 3,064,494 | 11/62 | Brewster | 308—238 X |
| 3,107,951 | 10/63 | Palm | 308—238 X |
| 3,124,394 | 3/64 | Rowlett | 308—238 X |
| 3,125,126 | 3/64 | Engels | 308—18 X |

FOREIGN PATENTS

| 1,208,127 | 9/59 | France. |

LEO SMILOW, *Primary Examiner.*